United States Patent
Merhav et al.

(10) Patent No.: US 6,473,534 B1
(45) Date of Patent: Oct. 29, 2002

(54) MULTIPLIER-FREE IMPLEMENTATION OF DCT USED IN IMAGE AND VIDEO PROCESSING AND COMPRESSION

(75) Inventors: Neri Merhav, Haifa (IL); Vasudev Bhaskaran, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/226,584

(22) Filed: Jan. 6, 1999

(51) Int. Cl.$^7$ .................................................. G06K 9/36
(52) U.S. Cl. .................. 382/250; 364/725.03; 382/251
(58) Field of Search ................................ 382/260, 268, 382/265, 250, 251; 364/725.03, 725.02, 725.01

(56) References Cited

U.S. PATENT DOCUMENTS

| | | | |
|---|---|---|---|
| 5,129,015 A | | 7/1992 | Allen et al. .................... 382/56 |
| 5,408,425 A | * | 4/1995 | Hou ........................... 364/725 |
| 5,574,661 A | * | 11/1996 | Cismas .................. 364/715.02 |
| 5,649,077 A | * | 7/1997 | On .............................. 395/119 |
| 5,712,809 A | * | 1/1998 | Girod .......................... 364/725 |
| 5,754,456 A | * | 5/1998 | Fitan ..................... 364/725.03 |
| 5,754,457 A | * | 5/1998 | Fitan ..................... 364/725.03 |
| 5,822,003 A | * | 10/1998 | Girod .......................... 382/250 |
| 5,832,135 A | * | 11/1998 | Merhav ....................... 382/260 |
| 5,883,827 A | * | 3/1999 | Ding .................... 364/725.03 |
| 6,112,219 A | * | 8/2000 | Girod .......................... 708/402 |
| 6,125,212 A | * | 9/2000 | Kresch ....................... 382/250 |
| 6,134,571 A | * | 10/2000 | Kresch ....................... 382/260 |
| 6,298,166 B1 | * | 10/2001 | Ratnakar .................... 382/248 |

OTHER PUBLICATIONS

Implementation of the 2D–IDCT; 7 pages http://mvs.infomatill.tu–chemnitz.de~jan/mpeg, Mar. 2002.*
A fast Algorithm for DCT–Domain, Inverse Motion Compensation; Merhav & Bhaskaran; 15 pages, Mar. 2002.*
A fast DCT–SQ "Scheme for Images", IEEE Trans. of the IFICE, vol. E71, No. 11, 1988, pp. 1095–1097.*
Direct Conversions Between DV format DCT and Ordinary DCT (Merhav) (a HP document) 11 pages, 1988.*
J.D. Allen et al., "The Multiply–Free Chen Transform—A Rational Approach to JPEG," PCS 91, pp. 227–230 (1991).
M. Boliek et al., "JPEG Image Compression Hardware Implementation with Extensions for Fixed–Rate and Compressed Image Editing Applications," SPIE, vol. 2187, pp. 13–22 (1994).
Y. Arai et al., "A Fast DCT–SQ Scheme for Images," The Transactions of the IEICE, vol. E71, No. 11, pp. 1095–1097 (1988).
V. Bhaskaran et al., "Image and Video Compression Standards," Fundamentals of Lossy Image Compression, pp. 93–95 (1995).

* cited by examiner

*Primary Examiner*—Jerome Grant, II

(57) ABSTRACT

Multiplier-free implementation of an approximation of the DCT used in image and video processing. In accordance with the primary aspect of the present invention, image and video processing is done with no multiplications and a fewer number of operations through the application of a modified Arai, Agui, and Nakajima (AAN) scheme for eight-point DCT.

19 Claims, 1 Drawing Sheet

MULTIPLIER-FREE IMPLEMENTATION OF DCT USED IN IMAGE AND VIDEO PROCESSING AND COMPRESSION

BACKGROUND OF THE INVENTION

1. Field of the Invention

The present invention relates generally to image and video processing and pertains more particularly to a multiplier-free implementation of an approximation of the discrete cosine transform (DCT).

2. Discussion of the Prior Art

When high-quality images must be compressed to save memory or transmission requirements, it is common practice to first transform the images to another space where the information can be represented more compactly. This is usually done block-by-block with a linear transformation (matrix multiplication). A typical arrangement is to perform eight-point transforms on row segments of eight pixels and then to perform eight-point transforms on the eight element column segments of this row transformed image. Equivalently, a single sixty-four-point transform could be performed on a pixel block of sixty-four pixels arranged in an eight-by-eight block.

One common choice for a one dimensional transform is the eight-point DCT matrix $S=\{s(k,n)\}_{k,n=0}^{7}$, where $$s(k, n) = \frac{c(k)}{2} \cos\left(\frac{2n+1}{16} \cdot k\pi\right) \quad (1)$$

and $c(0)=1/\sqrt{2}$ and $c(k)=1$ for $k>0$. Correspondingly, the eight-by-eight two-dimensional DCT transforms a block in the spatial domain, $x=\{x(n,m)\}_{n,m=0}^{7}$, into a matrix of frequency components, $X=\{X(k,l)\}_{k,l=0}^{7}$, according to the following equation $$X(k, l) = \frac{c(k)}{2} \frac{c(l)}{2} \sum_{n=0}^{7} \sum_{m=0}^{7} x(n, m) \cos\left(\frac{2n+1}{16} \cdot k\pi\right) \cos\left(\frac{2m+1}{16} \cdot l\pi\right) \quad (2)$$

The inverse transform is given by the following equation $$x(n, m) = \sum_{k=0}^{7} \sum_{l=0}^{7} \frac{c(k)}{2} \frac{c(l)}{2} X(k, l) \cos\left(\frac{2n+1}{16} \cdot k\pi\right) \cos\left(\frac{2m+1}{16} \cdot l\pi\right) \quad (3)$$

Then, in matrix form, $$X = SxS^t, \quad (4)$$

where the superscript t denotes matrix transposition. Similarly, let the superscript −t denote transposition of the inverse matrix. Then, $$x = S^{-1}XS^{-t} = S^t X S, \quad (5)$$

where the second equality follows from the unitarity of S.

One of ordinary skill in the art will realize that the DCT is the basis for standard image and video compression/decompression schemes such as JPEG, MPEG-1, MPEG-2, H.261, and H.263. Compression is performed using the DCT while decompression is performed using the inverse DCT (IDCT). If preferred, it is possible to sacrifice accuracy for speed in the computation of the DCT and IDCT. In some applications, it is necessary that both compression and decompression be fast. For example, given the demands of real-time playback and displaying capabilities, the overall compression/decompression scheme needs to be fast. In other applications, it is sufficient if only one or the other of the compression or decompression is fast. For example, in those situations where compression is performed only once, whereas decompression might be carried out many times, it is important that the decompression be fast. For simplicity of presentation, it is this latter asymmetric case that is presented here. However, one of ordinary skill in the art will realize that the principles disclosed apply equally to the symmetric case.

Turning first to FIG. 1, a flow diagram of the steps of MPEG decoding is shown. MPEG decoding is shown strictly as an example. One of ordinary skill in the art will be familiar with the steps in encoding/decoding in each of the standard schemes and realize that the discussion that follows applies to each. The process of decoding operates on a quantity of compressed data and begins with step 10. At step 10, the compressed data undergoes header decoding where general information for decoding is extracted, including identifying which of the available tables is to be used for decoding. Next at step 12, the data undergoes Huffman decoding where a table is used to convert the MPEG coefficients to the DCT coefficients. At step 14 the data undergoes inverse quantizing where a table is used to scale the data. Then at step 16, the data undergoes IDCT where the data is transformed back from the frequency domain to the spatial domain. At step 18, the data undergoes motion compensation where the data is converted from prediction residuals back to a valid video stream. Finally, at step 20, the data is displayed for the viewer.

The computation of the IDCT at step 16 is one of the major bottlenecks in the process of decoding DCT-based compression images and video. In an effort to increase speed, an approximation of the IDCT can be employed. This will introduce some errors, but with careful design the cost of the errors is small in comparison to the benefit of the increased speed. For compression, an approximate DCT can be employed as the situation dictates.

One example of an approximate DCT is presented in U.S. Pat. No. 5,129,015 issued to Allen et al., entitled "Apparatus And Method For Compressing Still Images Without Multiplication." This patent discloses an approximate DCT, based on a transform developed by Chen, which requires 224 shifts and 608 additions for an eight-by-eight DCT. The total number of operations is therefore 832.

Another example of an approximate DCT is presented in the book entitled IMAGE AND VIDEO COMPRESSION STANDARDS by Bhaskaran et al. In Chapter 3, Bhaskaran discloses an approximate DCT which requires 192 shifts and 576 additions for an eight-by-eight DCT. The total number of operations is therefore 768.

By comparison, the number of operations required for the exact Winograd DCT is 80 multiplications and 464 additions. If one assumes that a multiplication has equal weight to three basic operations on average, then the total number of operations is therefore 704.

Those in the image and video processing and compression field are driven by the desire for a faster approximate DCT and IDCT requiring fewer operations.

SUMMARY OF THE INVENTION

It is the primary object of the present invention to provide an improved multiplier-free implementation of an approximation of the DCT used in image and video processing that further reduces the number of operations in the performance of the DCT.

In accordance with the primary aspect of the present invention, image and video processing is done with no multiplications and a fewer number of operations through the application of a modified Arai, Agui, and Nakajima (AAN) scheme for eight-point DCT.

BRIEF DESCRIPTION OF THE DRAWING

The above and other objects and advantages of the present invention will be appreciated from the following specification when read in conjunction with the accompanying drawing wherein.

DETAILED DESCRIPTION OF THE PREFERRED EMBODIMENTS

Figure 1:
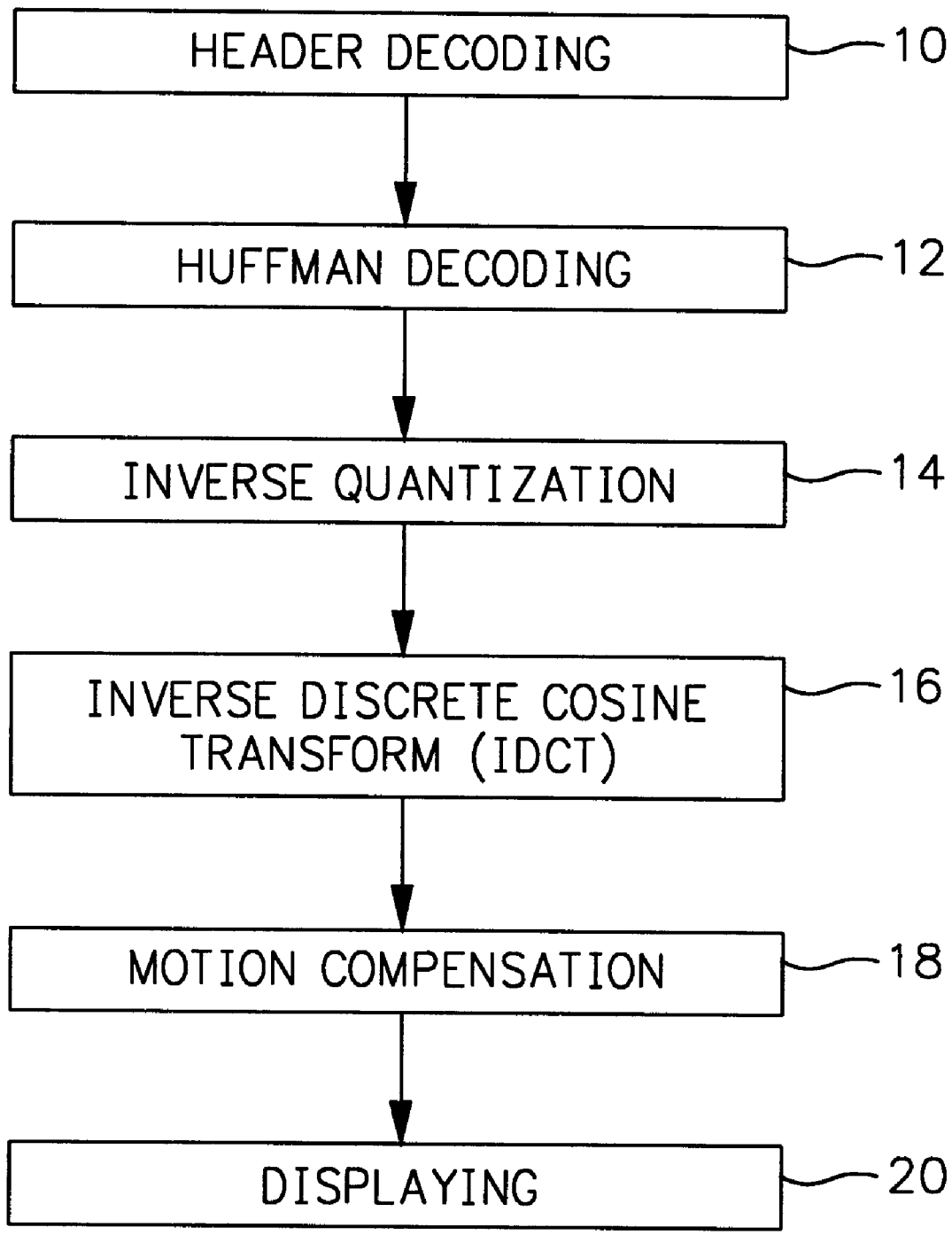
FIG. 1 is a flow diagram showing the steps of MPEG decoding.

The present invention was devised to provide a method of image and video processing that can be done with no multiplications and a fewer number of operations thereby increasing speed with acceptably minimal degradation of the output picture.

A scheme for an exact DCT, the inverse of which is performed in step 16, is presented in an article entitled "A Fast DCT-SQ Scheme for Images" in the TRANSACTIONS OF THE IEICE by Arai et al. (AAN scheme). Arai discloses a transform for eight-point DCT that involves the factorization of S in equations (4) and (5). According to this factorization, S is represented as follows $$S = DPB_1B_2MA_1A_2A_3, \tag{6}$$

where D is a diagonal matrix given by $$D = \mathrm{diag}\{0.3536, 0.2549, 0.2706, 0.3007, 0.3536, 0.4500, 0.6533, 1.2814\}, \tag{7}$$

P is a permutation matrix given by $$P = \begin{bmatrix} 1 & 0 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 0 & 1 \\ 0 & 1 & 0 & 0 & 0 & 0 & 0 & 0 \\ 0 & 0 & 0 & 0 & 1 & 0 & 0 & 0 \\ 0 & 0 & 0 & 1 & 0 & 0 & 0 & 0 \\ 0 & 0 & 0 & 0 & 0 & 0 & 1 & 0 \end{bmatrix},$$

and the remaining matrices are defined as follows:

$$B_1 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 1 \\ 0 & 0 & 0 & 0 & 0 & 1 & 1 & 0 \\ 0 & 0 & 0 & 0 & 0 & 1 & -1 & 0 \\ 0 & 0 & 0 & 0 & -1 & 0 & 0 & 1 \end{bmatrix}$$

$$B_2 = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & -1 & 1 & 0 & 0 & 0 & 0 \\ 0 & 0 & 0 & 0 & 1 & 0 & 0 & 0 \\ 0 & 0 & 0 & 0 & 0 & 1 & 0 & 1 \\ 0 & 0 & 0 & 0 & 0 & 0 & 1 & 0 \\ 0 & 0 & 0 & 0 & 0 & -1 & 0 & 1 \end{bmatrix}$$

$$M = \begin{bmatrix} 1 & 0 & 0 & 0 & 0 & 0 & 0 & 0 \\ 0 & 1 & 0 & 0 & 0 & 0 & 0 & 0 \\ 0 & 0 & 0.7071 & 0 & 0 & 0 & 0 & 0 \\ 0 & 0 & 0 & 1 & 0 & 0 & 0 & 0 \\ 0 & 0 & 0 & 0 & -0.9239 & 0 & -0.3827 & 0 \\ 0 & 0 & 0 & 0 & 0 & 0.7071 & 0 & 0 \\ 0 & 0 & 0 & 0 & -0.3827 & 0 & 0.9239 & 0 \\ 0 & 0 & 0 & 0 & 0 & 0 & 0 & 1 \end{bmatrix}$$

$$A_1 = \begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 1 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

$$A_2 = \begin{bmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & -1 & -1 & 0 & 0 \\ 0 & 0 & 0 & 0 & 0 & 1 & 1 & 0 \\ 0 & 0 & 0 & 0 & 0 & 0 & 1 & 1 \\ 0 & 0 & 0 & 0 & 0 & 0 & 0 & 1 \end{bmatrix}$$

$$A_3 = \begin{bmatrix} 1 & 0 & 0 & 0 & 0 & 0 & 0 & 1 \\ 0 & 1 & 0 & 0 & 0 & 0 & 1 & 0 \\ 0 & 0 & 1 & 0 & 0 & 1 & 0 & 0 \\ 0 & 0 & 0 & 1 & 1 & 0 & 0 & 0 \\ 0 & 0 & 0 & 1 & -1 & 0 & 0 & 0 \\ 0 & 0 & 1 & 0 & 0 & -1 & 0 & 0 \\ 0 & 1 & 0 & 0 & 0 & 0 & -1 & 0 \\ 1 & 0 & 0 & 0 & 0 & 0 & 0 & -1 \end{bmatrix}.$$

According to this factorization, $S^{-1}$ is represented either as $$S^{-1} = A_3^{-1} A_2^{-1} A_1^{-1} M^{-1} B_2^{-1} B_1^{-1} P^{-1} D^{-1} \tag{8}$$

or as $$S^{-1} = S^t = A_3^t A_2^t A_1^t M^t B_2^t B_1^t P^t D^t = A_3^t A_2^t A_1^t M B_2^t B_1^t P^t D, \tag{9}$$

where the last equality follows from the symmetry of M and D.

Adopting the latter factorization, which is somewhat preferable, one is interested in approximating the matrix $S^{-1}$ by a product of matrices whose elements are all in the set $F=\{0, \pm 1, \pm 2, \pm 4, \pm 8 \ldots, +\frac{1}{2}, +\frac{1}{4}, \frac{1}{8} \ldots\}$, so that multiplication by these elements is either trivial or easily implementable by simple binary shifts. Since the multiplication by D can be absorbed into the inverse quantization step 14 and since the matrices P, $B_1$, $B_2$, $A_1$, $A_2$, and $A_3$ have their elements in the set F, then the only elements that constitute nontrivial multiplications are in the matrix M.

The straightforward AAN approach would be to simply quantize each element of M to the nearest member of the set F. For example, the value 0.7071 could be quantized to $\frac{1}{2}$. Then the quantized version of M, denoted $[M]_F$, would be used in place of M in equation (9). This approach could be made more accurate, however, through one or both of the modifications outlined below.

First, a better approach is to modify the AAN scheme to take advantage of the fact that the diagonal elements of D are absorbed into the inverse quantization step 14, which can be controlled. As a result, the values of D can be adjusted to compensate for errors caused by quantizing M. Specifically, one would like to find a diagonal matrix D' such that the product $S''S\Delta_3{}^t A_2{}^t A_1{}^t [M]_F B_2{}^t B_1{}^t P^t D^t S$, which describes the overall transformation performed by the exact DCT S at the encoder side followed by the approximate IDCT $S'^t$ at the decoder side, would be as close as possible to the identity matrix I. Clearly, the case of D'=D, which corresponds to the above described straightforward AAN scheme, is a special case that might not be optimal.

Second, an additional improvement can be achieved by further modifying the AAN scheme by introducing an additional parameter $\alpha \in IR$ into the approximation of $S^{-1}=S'$ as $$S''=A_3{}^t A_2{}^t A_1{}^t [\alpha M]_F B_2{}^t B_1{}^t P^t D'', \tag{10}$$

where $D''=D'/\alpha$. The idea is that multiplication of M by a scalar $\alpha > 1$ and division of D' by $\alpha$ have the overall effect of reducing the quatization error in step 14 by a factor of $\alpha$. As a result, the larger that $\alpha$ is, the smaller that the quantization error is. However, if $\alpha$ is too large, then multiplication of M by $\alpha$ might become expensive again in terms of time and operations. For this reason, it has been found preferable to limit $\alpha$ to being greater than or equal to one and less than or equal to two.

It will be convenient to represent the data x in a one-dimensional representation as column-stacked. The column-stacked version of Z' of an m by n matrix Z is a (mn)-dimensional column vector formed by concatenating the columns of Z from left to right. The basic fact with regard to column stacking is that if $W=AZB^t$ where Z is as above, and A and B are matrices of dimension k by m and l by n, respectively, then $W'=(B \oplus A)Z'$, where $B \oplus A$ is the Kroenecker tensor product of B and A, defined as:

$$B \otimes A = \begin{bmatrix} b_{11}A & b_{12}A & \cdots & b_{1n}A \\ b_{21}A & b_{22}A & \cdots & b_{2n}A \\ \cdots & \cdots & \cdots & \cdots \\ b_{l1}A & b_{l2}A & \cdots & b_{ln}A \end{bmatrix}. \tag{11}$$

For simplicity, it was preferably chosen to minimize a distance measure between $S''S$ and I that corresponds to one-dimensional (1D) signals and the 1D DCT. Specifically, consider the definition of the mean square error (MSE) $\epsilon^2$ as $$\epsilon^2 = tr\{(I-S''S)R(I-S''S)^t\} = tr\{(S^t - S''^t)R(S - S'')\} \tag{12}$$

where R is the covariance matrix of the 1D time-domain signal, and R=SRS' is the covariance of the DCT-domain signal. The covariance matrix R (or, equivalently, R) can either be estimated empirically from the data or be assumed to be a certain model, for example, AR(1) where the (i,j)th element of R is proportional to $\rho^{|i-j|}$, $|\rho|<1$. The latter approach was adopted as being preferable, leaving $\rho$ as a parameter to be tuned for obtaining the best results.

The advantage of the criterion in equation (12) is that, at least for a given $\alpha$, the global optimum D" has a closed-form expression, and so, only a line-search over $\alpha$ is required. Moreover, since the parameter a affects the solution only via the quantized version of $\alpha M$, only a finite number of values of $[\alpha M]_F$ should be examined.

Specifically, for a given $\alpha$ and denoting $W=A_3{}^t A_2{}^t A_1{}^t [\alpha M]_F B_2{}^t B_1{}^t P^t$, equation (12) can be rewritten as $$\epsilon^2 = tr\{(S^t - WD'')R(S - D''W^t)\} \tag{13}$$

whose minimization is equivalent to the minimization of $$tr\{WD''RD''W^t - 2WD''RS\}. \tag{14}$$

Taking derivatives of the latter expression with respect to the diagonal elements of D" and equating to zero, lead to the following set of linear equations $$tr\{W^t WJ_k RD''\} = tr\{J_k RSW\} \quad k=1, 2, \ldots, 8 \tag{15}$$

where $J_k$ is a matrix whose entries are all zero except for the (k,k)th element which is 1. Since pre-multiplication by $J_k$ extracts only the kth row of the multiplied matrix, the right hand side of equation (15) is just $(RSW)_{kk}$, namely, the (k,k)th element of the product RSW. On the left hand side, $J_k$ extracts the kth column of $W^tW$ and the kth row of R, which gives their outer product. Therefore, equation (15) can be written more explicitly as $$\sum_{i=1}^{8} (W^t W)_{ik} R_{ki} d_i = (RSW)_{kk} \quad k = 1, 2, \ldots, 8 \tag{16}$$

where $d_i$, i=1, 2, ..., 8, are the diagonal elements of D". Since both $W^tW$ and R are symmetric matrices, it follows that the vector d that forms the diagonal of D" is given by $[(W^tW) \cdot R]^{-1} K$, where $\cdot$ denotes element-by-element multiplication and K is a column vector formed by the diagonal elements of the product RSW.

One of ordinary skill in the art will realize that the modified AAN scheme described above could be implemented by hardware, software, or a dedicated signal processor (DSP). Experiments using the modified AAN scheme have been performed for various values of $\alpha$ and $\rho$. It was observed that the results are fairly insensitive to the exact value of $\rho$ as long as it is greater than or equal to 0.9 and less than or equal to 1. This is an advantage as it relaxes the assumption that $\rho$ must be known or estimated accurately. Therefore, $\rho$ was preferably chosen to be equal to 0.9. For this value of $\rho$, it has been found that the best value of $\alpha$ is $\alpha=1.2139$, which in turn gives $$M' = [\alpha M]_F = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & -1 & 0 & -0.5 & 0 \\ 0 & 0 & 0 & 0 & 0 & 1 & 0 & 0 \\ 0 & 0 & 0 & 0 & -0.5 & 0 & 1 & 0 \\ 0 & 0 & 0 & 0 & 0 & 0 & 0 & 1 \end{bmatrix} \quad (17)$$

and $$D''=\text{diag}\{0.3536, 0.2165, 0.2230, 0.2545, 0.3536, 0.3677, 0.4618, 0.9069\}. \quad (18)$$

It is important to note that multiplication by M' in equation (17) involves merely two shift-and-adds. As a result, the modified AAN scheme requires 32 shifts and 416 additions for an eight-by-eight DCT. The total number of operations is therefore 448. This represents a forty-six percent savings over the Allen approximate DCT, a forty-two percent savings over the Bhaskaran approximate DCT, and at least a forty percent savings over the exact Winograd DCT. As a result, the present invention provides an improved multiplier-free implementation of an approximation of the DCT used in image and video processing that further reduces the number of operations in the performance of the DCT.

Experiments using a JPEG encoder that employs the exact DCT and a decoder that employs the modified AAN scheme have been performed. The reproduced images are generally both objectively and subjectively indistinguishable from their counterparts using the exact DCT for encoding and the exact IDCT for decoding.

While the invention has been illustrated and described by means of specific embodiments, it is to be understood that numerous changes and modifications may be made therein without departing from the spirit and scope of the invention as defined in the appended claims.

What is claimed is:

1. In a system that compresses or decompresses image and video pixel data using a discrete cosine transform process, an improvement comprising:
   factorizing the transform process into a number of matrices;
   quantizing at least one of the matrices, to thereby produce at least one corresponding quantized matrix having values selected from the set of numbers including zero, and positive and negative numbers that are powers of two;
   adjusting the values of at least one matrix that was not quantized to thereby compensate for errors which would otherwise occur as a result of quantizing values, to thereby produce at least one adjusted matrix; and
   providing hardware logic that performs the transform process upon input data, including operations derived from each quantized matrix and each adjusted matrix.

2. An improvement according to claim 1, wherein said improvement further comprises:
   performing the factorizing, quantizing, and adjusting as part of a preprocessing design function; and
   implementing hardware via the design function that effects a modified AAN scheme when applied to input data.

3. An improvement according to claim 1, wherein:
   quantizing includes first multiplying all values of said at least one matrix by a scalar to thereby obtain at least one scaled matrix, and then quantizing at least one scaled matrix; and
   dividing all values of at least one matrix by the scalar;
   whereby quantization error is thereby further reduced in dependence upon the scalar.

4. An improvement according to claim 3, wherein:
   said improvement further comprises implementing a factored matrix approach to the transform process, including use of a diagonal matrix D and a second matrix;
   quantizing includes multiplying all values of the matrix D by a scalar $\alpha$;
   dividing includes dividing all values of the second matrix by the scalar $\alpha$.

5. An improvement according to claim 3, wherein the scalar has a value of at least one and no more than two.

6. An improvement according to claim 1, wherein adjusting the values includes adjusting values of a diagonal matrix to correspond to results of trace function minimization.

7. An improvement according to claim 1, further comprising performing the transform process substantially only through application of addition, subtraction and bit-shifting processes.

8. An improvement according to claim 1, further comprising performing the transform process in a discrete manner upon individual eight-column by eight-row matrices of data.

9. An improvement according to claim 1, wherein quantizing includes rounding values to a new value selected from the group of zero, powers of two that are positive in sign, and powers of two that are negative in sign.

10. In a system that compresses or decompresses image and video pixel data using a discrete cosine transform process to process input data, a method comprising:
    factorizing the transform process into a number of matrices;
    quantizing at least one matrix to thereby obtain at least one quantized matrix having values selected from the set of numbers including zero, and positive and negative numbers that are powers of two;
    adjusting values of at least one matrix that has not been quantized, to thereby reduce errors that would otherwise be introduced by quantizing to thereby obtain at least one adjusted matrix;
    performing the transform process by substantially hardware-only processing of the input data, where the hardware implements operations dependent upon each quantized matrix and each adjusted matrix.

11. A method according to claim 10, wherein:
    quantizing includes first multiplying all values of said at least one matrix by a scalar to thereby obtain at least one scaled matrix, and then quantizing at least one scaled matrix; and
    dividing all values of at least one matrix by the scalar in order to reduce the quantization error by the factor of the scalar.

12. A method according to claim 11, wherein:
    said system implements a factored matrix approach to the transform process, including use of a diagonal matrix D and a second matrix;
    quantizing includes multiplying all values of the matrix D by a scalar $\alpha$;
    dividing includes dividing all values of the second matrix by the scalar $\alpha$.

13. A method according to claim 11, wherein the scalar has a value of at least one and no more than two.

14. A method according to claim 10, wherein adjusting the values includes adjusting values of a diagonal matrix to correspond to results of trace function minimization.

15. A method according to claim 10, further comprising performing the transform process in substantially hardware only, the hardware consisting substantially of addition, subtraction and bit-shifting processes.

16. A method according to claim 10, wherein quantizing includes rounding values to a new value selected from the group of zero, powers of two that are positive in sign, and powers of two that are negative in sign.

17. In a system that compresses or decompresses image and video pixel data using a discrete cosine transform process to process input data, a method comprising:

factorizing the transform process into a number of matrices;

quantizing at least one matrix to thereby obtain at least one quantized matrix having values selected from the set of numbers including zero and positive and negative numbers that are powers of two;

adjusting values of at least one matrix that has not been quantized, to thereby reduce errors that would otherwise be introduced by quantizing to thereby obtain at least one adjusted matrix;

performing the transform process upon the input data using operations dependent upon each quantized matrix and each adjusted matrix.

18. A method according to claim 17, wherein adjusting the values includes adjusting values of a diagonal matrix to correspond to results of trace function minimization.

19. A method according to claim 17, wherein:

factorizing, quantizing and adjusting are all performed as part of a preprocessing hardware design function; and performing the transform process includes applying hardware designed via the preprocessing function to the input data.

* * * * *